United States Patent Office 3,180,867
Patented Apr. 27, 1965

3,180,867
PIPERAZINE DERIVATIVES
Seymour L. Shapiro, Hastings on Hudson, Louis Freedman, Bronxville, and Harold Soloway, New Rochelle, N.Y., assignors to U.S. Vitamin & Pharmaceutical Corporation, New York, N.Y., a corporation of Delaware
No Drawing. Filed May 17, 1961, Ser. No. 110,635
10 Claims. (Cl. 260—268)

This invention is concerned with a series of novel 1,4-disubstituted piperazines and homopiperazines which are especially effective as a broncho-dilators.

With the widely used group of bronchodilator agents, whose structure is based on epinephrine, structure-activity relationships have indicated the need for the pyrocatechol group, and alcohol function on the alkylene chain and substitution at the basic center, particularly with an isopropyl group. In addition, significant bronchodilator activity requires that the amino nitrogen have at least one hydrogen unsubstituted. Compounds of this type, moreover, have had associated with their utility, undesirable central nervous system and undesirable cardiovascular side effects which has limited their effectiveness as therapeutic agents.

We have now found that within a specific and narrowly defined and structurally unique group of 1,4-disubstituted piperazines, that bronchodilator activity may be obtained in the absence of toxicity and undesirable central nervous system or cardiovascular side effects.

The compounds providing these novel and desirable features and which are the subject matter of this invention are characterized by the formula shown:

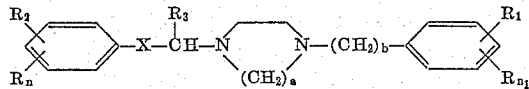

wherein X is linking element selected from the group consisting of —CO— (as well as typical carbonyl derivatives), —CHOH—, —CHCl—, —CHBr—, and wherein $a$ is an integer ranging from 2 (to give the piperazine ring system) to 3 (to give the homopiperazine system); $b$ is an integer ranging from 1–2. $R_1$ and $R_2$ characterize substitution in the benzene rings in positions unoccupied by $R_n$ and $R_{n_1}$ and includes hydrogen, lower alkyl, trifluromethyl, cyano, alkylthio, and alkoxyl.

The substituents $R_n$ and $R_{n_1}$ are halogen, wherein $n$ and $n_1$ are integers ranging from 0 to 4 and in this invention, moreover, it is required that the sum of $n+n_1$ be at least 2 to provide at least a total of 2 halogen substituents distributed over each or both of the phenyl rings. If in either case $n$ or $n_1$ is zero, the relevant groups $R_n$ or $R_{n_1}$ become hydrogen. Thus, by way of example, $R_n$ can be 2,4-dichloro and $R_{n_1}$ can be H; or $R_n$ can be bromo and $R_{n_1}$ can be chloro; $R_{n_1}$ can be 2,4-dichloro and $R_n$ can be p-fluoro or $R_{n_1}$ can be 2-methyl-4-chloro and $R_n$ can be p-iodo in satisfying the structural requirements of the compounds of this invention. $R_3$ is hydrogen or lower alkyl.

In addition, either or both of the benzene rings in the formula above can be replaced by other aromatic ring systems, such as those derived from thiophene, furane, pyridine, or naphthalene, maintaining the substituent requirements for $R_n$ and $R_{n_1}$ as described above.

Moreover, this invention contemplates compounds derivable from the indanone and tetralone systems which are typified by the following formula:

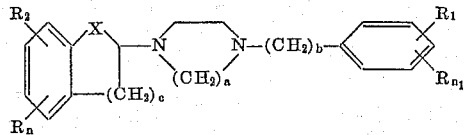

wherein the designations $R_1$, $R_2$ $R_n$, $R_{n_1}$, X, $a$ and $b$ have the same significance as described above, and C is an integer ranging from 1 to 2.

The preferred embodiment of this invention are compounds of the formula:

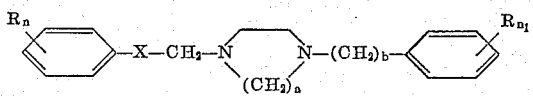

wherein X is selected from the group consisting of —CO— (and carbonyl derivatives), —CHOH—, and —CHCl—, and $R_n$ and $R_{n_1}$ are halogen substituents and especially chlorine and bromine substituents so that the sum of $n+n_1$ is at least two and these halogens may be substituted on each or both of the benzene rings, as for example $R_{n_1}$ can be 2,4-dichloro and $R_n$ can be H; or $R_{n_1}$ can be chloro and $R_n$ can be bromo; or $R_{n_1}$ can be bromo and $R_{n_1}$ can be chloro in satisfying the structural requirements of the compounds of this invention. For peak bronchodilator activity it is desirable to have $R_{n_1}$ substituted so that it provides at least one halogen in the para position.

By contrast to the conventionl bronchodilators, introduction of $R_2$ as 3,4-dihydroxy is not consistent with good activity in this series of compounds. This series is also distinct in that the amino substituent is not secondary amino group, but tertiary amino group.

By virtue of the basicity inherent in the piperazine structure, the compounds of this invention can form mono or dibasic salts although the mono salts are preferred and are more readily accessible and stable. Thus, for example, salts are conveniently obtained from the non-toxic mineral acids such as hydrochloric, hydrobromic, sulfuric and nitric acids; from the organic acids such as, for example, fumaric, malic, tartaric, citric and the like; and from the acidic nitrogen compounds such as theophylline, 8-chlorotheophylline, 8-bromotheophylline. As the molecular bulk of $R_n$ plus $R_{n_1}$ increases, and particularly where it may total two bromo groups, or three or more halogens, and especially wherein X is —CO—, the mineral acid salts become less water soluble, and the mono organic acid salts provide better water solubility. In certain instances the dihydrobromide salt is so sparingly soluble that it provides a simple method for obtaining pure compounds. It, in turn, can be converted to its free base, and other salts processed from the base by conventional procedures.

The compounds of this invention can be quaternized with the organic derivatives of the strong mineral acids such as methyl iodide, ethyl bromide, to provide mono and diquaternary salts.

It is likely that the most basic of the piperazine nitrogens is the one bearing the $R_{n_1}$ aralkyl group, and the mono acid salts, and mono quaternary salts undoubtedly involve salt formation at this site.

Supplementing their pharmacological utility, the compounds of this invention serve as reactants in the preparation of additional structures of interest. Thus, for example, X as —CO—, is converted to X=—CHOH— by reduction, and to a variety of carbonyl derivatives such as oximes, semi-carbazones, and hydrazones by conventional procedures. The oximes, in turn, can be reduced to give the amino function X=—CHNH₂— and the hydrazones reduced to give the hydrazino function

X=—CHNHNH₂—

The X=—CO— series can also be reacted with Grignard reagents to give tertiary alcohols.

The alcohols X=—CHOH— on acylation give esters; on treatment with isocyanates, give carbamic acid derivatives such as, for example, ethyl isocyanate or phenyl isocyanate to give X=—CHOCONC₂H₅— and

—CHOCONC₆H₅— respectively. Additionally, the unsubstituted carbamic acid derivative X=CHOCONH₂— may be prepared. When X=—CHCl—, this reactive halogen site permits a variety of synthetic conversions upon treatment with amines, dialkylaminoalkylamines, phenols, alcohols, and amino alcohols, to give compounds wherein the halogen is replaced by the nucleophile used as the reactant.

Of additional significance in this series, is the fact that when X=—CHOH— or —CHCl—, that the carbon atom in X is asymmetric and, as a consequence, the compounds within this category are capable of resolution into their optical antipodes and such resolved $d$ and $l$ forms of the compounds of this invention are considered as embodied in this invention.

For the synthesis of the compounds of this invention, the following routes have proven to be convenient and consistent with the obtention of high yields and high purity products. The appropriate $R_n$-substituted phenacyl halide is reacted with the ($R_{n_1}$-aralkyl)-piperazine (or homopiperazine) typified by the equation below to yield the compounds where X=—CO—.

Typical of the aralkylpiperazines (and homopiperazines) are those described in the table below:

TABLE I.—PIPERAZINE INTERMEDIATES

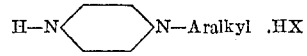

| Aralkyl Group | HX | M.P., °C. (R.S.)[a] or B.P., °C./mm. press. |
|---|---|---|
| C₆H₅CH₂—[b] | | |
| m-CH₃C₆H₄CH₂—[b] | | |
| o-ClC₆H₄CH₂— | | 92-98/0.13 |
| p-ClC₆H₄CH₂— | | 92-96/0.10 |
| p-ClC₆H₄CH₂— | 2HCl | 240-243 (A) |
| p-BrC₆H₄CH₂— | | 112-116/0.25 |
| 2,4-diClC₆H₃CH₂— | | 106-108/0.05 |
| 3,4-diClC₆H₃CH₂— | | 124-128/0.02 |
| p-CH₃OC₆H₄CH₂— | | 147-148/3.0 |
| p-CH₃OC₆H₄CH₂— | 2HPic[d] | 245-248 (B) |
| C₆H₅CHCH₃— | H₂O | 88/0.25 |
| C₆H₅CH₂CH₂— | | 92-96/0.15 |
| p-ClC₆H₅CH₂—[c] | | 114-120/0.20 |

[a] Melting points are not corrected and were determined on Fisher-Johns melting point block. R.S.—recrystallizing solvent: A=methanol; B=acetonitrile.
[b] Available commercially.
[c] Derived from homopiperazine.
[d] HPic=picric acid.

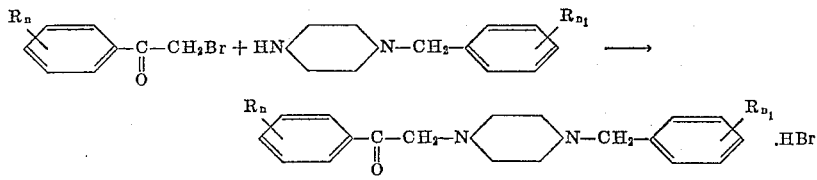

The carbonyl compounds are converted to the alcohols X=—CHOH— by reduction using reactants or catalysts and conditions which do not remove the $R_n$ and $R_{n_1}$ halogens. The preferred reducing agent is sodium borohydride.

The alcohols, X=—CHOH— can also be prepared by reaction of the $R_{n_1}$-substituted benzylpiperazine with the $R_n$-substituted styrene oxide as shown in the equation below:

Additional piperazines include N-(p-iodobenzyl)piperazine, N - (2,4 - dibromobenzyl)piperazine, N-(p-fluorobenzyl)piperazine, N - (2,4 - dichlorobenzyl)homopiperazine, N-[β-(2,4 - dichlorophenyl)ethyl]piperazine, N-[β-(4-bromophenyl)ethyl]piperazine.

The reactant substituted styrene oxides were prepared by the method of Bergkvist [Chem. Abstr. 44, 1446 (1950)].

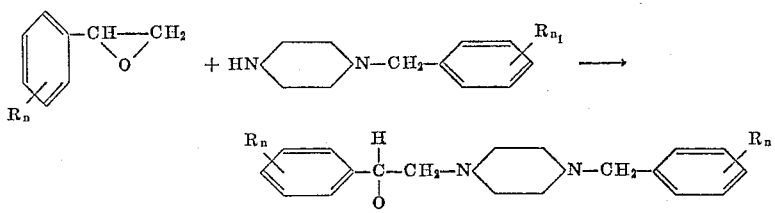

The halides X=—CHCl— result from treatment of the alcohols, X=—CHOH— with thionyl chloride using this agent as the reaction solvent, or in an inert organic solvent such as benzene or chloroform.

The necessary reactants and, in particular, the substituted phenacyl halides, the mono substituted aralkyl piperazines, and substituted styrene oxides, are obtained by procedures available in the literature. Thus, for example, the phenacyl halides which were not commercially accessible were obtained by polyphosphoric acid catalyzed acylation of the appropriately $R_n$-substituted benzene to give the acetophenone which in turn was converted to the $R_n$-substituted phenacyl bromide by bromination. [Organic Synthesis, Collective Volume I, John Wiley & Sons, New York, N.Y. (1951), p. 127.] In this manner from reactant halobenzenes or acetophenones, phenacyl halides not commercially accessible were prepared, m-bromophenacyl bromide, 2,5-dichlorophenacyl bromide, 2-chloro-5-bromophenacyl bromide, o-chlorophenacyl bromide, 2,4-dichlorophenacyl bromide.

Examples typifying the compounds of this invention which are in no sense limiting are given below:

*Example 1.—$N^1$-(p-chlorobenzyl)piperazine*

A solution of 200 ml. of 8.7 molar ethanolic hydrogen chloride was added to a solution of 390 g. (2.0 mole) of piperazine hexahydrate in 800 mls. of ethanol, while the temperature was maintained below 30°. The temperature of the reaction mixture was then raised to 40° during the addition, over 10 minutes, of 232 g. (2.0 mole) of p-chlorobenzyl chloride. After stirring for 20 minutes at 40°, piperazine dihydrochloride was removed, and treatment of the filtrate 200 ml. of 8.7 molar ethanolic hydrogen chloride precipitated the dihydrochloride of the product which was separated. Additional material was obtained by addition of ether to the filtrate. The dihydrochloride on recrystallization (methanol) melted 240–243°.

The $N^1$ - (p - chlorobenzyl)piperazine dihydrochloride, upon solution in water, made basic with 40% aqueous sodium hydroxide was converted to the product, which upon being salted out with excess potassium carbonate was extracted with ether. After drying (magnesium sulfate) and removal of the ether, upon fractional distillation 136 g. (64%) of product was obtained, B.P. 122–126° (0.8 mm.).

In a similar manner, the substituted piperazines shown in Table I were obtained.

*Example 2.—1-(p-chlorophenacyl)-4-(p-chlorobenzyl) piperazine*

A stirred solution of 70.2 g. (0.3 mole) of α-bromo-p-chloroacetophenone in 240 mls. of isopropyl alcohol was maintained at 65–70°, and treated over 1 hour with a solution of 69.3 g. (0.33 mole) of $N^1$-(p-chlorobenzyl) piperazine in 110 mls. of isopropyl alcohol. Stirring and heating at 65–70° was continued for an additional 5 hours.

When cool, the formed product hydrobromide was separated and, on addition to water, made basic with 40% aqueous sodium hydroxide, was converted to the product and was extracted into ether, the ether extracts dried (magnesium sulfate) and then filtered. After removal of the ether, the residue, on recrystallization (ethanol) gave 61 g. (57%) of product, M.P. 108°.

*Analysis.*—Calcd. for $C_{19}H_{20}Cl_2N_2O$: C, 62.8; H, 5.5; N, 7.7. Found: C, 63.0; H, 5.6; N, 8.0.

The product, upon treatment with molar equivalent quantities of organic acids, such as acetic acid, malic acid, or citric acid, gave the corresponding organic acid salts.

*Example 2A.—1-(p-chlorophenacyl)-4-(p-chlorobenzyl) piperazine oxime hydrochloride*

A mixture of 2.5 g. (0.007 mole) of 1-(p-chlorophenacyl)-4-(p-chlorobenzyl)piperazine and 2.1 g. (0.03 mole) of hydroxylamine hydrochloride in 15 mls. of pyridine and 15 mls. of ethanol was heated under reflux for 2 hours, then concentrated at diminished pressure. The residue, after trituration with water and recrystallization (ethanol) yielded 1.5 g. of the oxime (51%), M.P. 204–205° (as the hydrochloride).

*Analysis.*—Calcd. for $C_{19}H_{22}Cl_3N_3O$: C, 55.0; H, 5.4; N, 10.1. Found: C, 54.9; H, 5.3; N, 10.5.

*Example 2B.—1-(p-chlorophenacyl)-4-(p-chlorobenzyl) piperazine semicarbazone hydrochloride*

A solution of 3 g. (0.0083 mole) of 1-(p-chlorophenacyl)-4-(p-chlorobenzyl)piperazine, 2.7 g. (0.024 mole) of semicarmazide hydrochloride and 3.3 g. (0.024 mole) of sodium acetate trihydrate in 50 mls. of 50% aqueous ethanol was heated under reflux for one hour. When cool, the product was separated and recrystallized (80% aqueous ethanol) to give 2.0 g. (53%) of the semicarbazone as the hydrochloride, M.P. 184–185°.

*Analysis.*—Calcd. for $C_{20}H_{24}Cl_3N_5O$: C, 52.6; H, 5.3. Found: C, 52.6; H, 5.6.

*Example 3.—1-(p-bromophenacyl)-4-(p-chlorobenzyl) piperazine monohydrochloride monohydrate*

A solution of 35.7 g. (0.17 mole) of $N^1$-(p-chlorobenzyl)piperazine in 135 mls. of isopropyl alcohol was added slowly to a stirred solution of 41.5 g. (0.15 mole) of 2,4'-dibromoacetophenone in 240 mls. of isopropyl alcohol at 65–70°. After stirring at 70° for 7 hours and cooling, the precipitate was separated, suspended in water, converted to the free base of the product with aqueous sodium hydroxide. The formed base was extracted with chloroform, dried (magnesium sulfate), filtered. The chloroform filtrate after concentration to 200 mls., was added to 600 mls. of cold ether which had been previously saturated with hydrogen chloride. The formed product was separated to give 57 g., M. 210–245° which, on recrystallization (water) gave 53 g. (76%), d. 230–240°.

[No sharp melting points could be obtained even after repeated recrystallization and drying. Apparently, the compound is sensitive to high temperatures, showing signs of decomposition near 190°.]

*Analysis.*—Calcd. for $C_{19}H_{23}BrCl_2N_2O_2$: C, 49.4; H, 5.0; N, 6.1. Found: C, 49.4; H, 5.4; N, 6.5. Analysis indicated the material to be a monohydrate.

*Example 3A.—1-(p-bromophenacyl)-4-(p-chlorobenzyl) piperazine methiodide*

1-(p-bromophenacyl)-4-(p-chlorobenzyl)piperazine monohydrochloride monohydrate (4.09 g., 0.0088 mole) was suspended in water, made basic with dilute aqueous sodium hydroxide and the liberated base extracted with chloroform, which was dried (magnesium sulfate), filtered, the solvent removed. The residue of free base in 150 mls. of acetonitrile was reacted with 3.0 g. (0.021 mole) of methyl iodide to give, after 48 hours at 20°, 2.7 g. of white crystals, melting at 196–210°. Recrystallization from 250 mls. of boiling methanol gave 0.2 g. of insoluble material, melting at 220–225°, and, after standing, 1.2 g. of the methiodide, melting at 201–204°.

*Analysis.*—Calcd. for $C_{20}H_{23}BrClI_4N_2O$: C, 43.7; H, 4.2; N, 5.10. Found: C, 44.0; H, 4.2; N, 4.6.

*Example 3B.—Hydrazone of 1-(p-bromophenacyl)-4-(p-chlorobenzyl)piperazine*

The free base from 4.6 g. (0.01 mole) of the product of Example 3 was prepared as described above and dissolved in 50 ml. of ethanol, followed by the drop-wise addition of 0.9 g. (excess) of 95% hydrazine in 10 ml. of ethanol over 20 minutes. The reaction was then maintained at 60° for 2 hours, the solvents removed, and the residue, after successive treatment with benzene, followed by evaporation of the benzene, granulated and was recrystallized (ethanol-water) to yield 2.5 g. (54% of product), M.P. 97–98°.

*Analysis.*—Calcd. for $C_{19}H_{22}BrClN_4$: C, 54.1; H, 5.3; N, 13.3. Found: C, 54.1; H, 5.3; N, 12.8.

*Example 3C.—1-(p-bromophenacyl)-4-(p-chlorobenzyl)piperazine oxime hydrochloride*

The oxime was prepared by treating the mixture of 3.2 g. (0.007 mole) of the product of Example 3 in 15 ml. of ethanol and 20 ml. of pyridine with 2.1 g. (0.03 mole) of hydroxylamine hydrochloride, followed by reflux for two hours. The solvents were removed and the residue, on trituration with water, gave the product as its hydrochloride which on recrystallization (ethanol) melted 200–201°.

*Analysis.*—Calcd. for $C_{19}H_{22}BrCl_2N_3O$: C, 49.7; H, 4.8; N, 9.2. Found: C, 49.7; H, 4.7; N, 9.5.

*Example 3D.—1-(p-bromophenacyl)-4-(p-chlorobenzyl)piperazine semicarbazone hydrochloride*

A mixture of 3.8 g. (0.0083 mole) of the product of Example 3 in 50 ml. of 50% aqueous ethanol containing 4.4 g. (0.032 mole) of sodium acetate trihydrate was treated with 2.7 g. (0.024 mole) of semicarbazide hydrochloride and heated under reflux for two hours. When cool, the solvent was removed and after trituration with water and recrystallization (ethanol-water) the semicarbazone as the hydrochloride was obtained in 50% yield, M.P. 186–188°.

*Analysis.*—Calcd. for $C_{20}H_{24}BrCl_2N_5O$: C, 47.9; H, 4.8. Found: C, 47.9; H, 5.3.

*Example 4.—2-[4-(p-chlorobenzyl)piperazinyl]-1-(p-bromophenyl)ethanol*

A cooled suspension of 9.1 g. (0.02 mole) of 1-(p-bromophenacyl)-4-(p-chlorobenzyl)piperazine monohydrochloride monohydrate in 60 mls. of bis(2-methoxyethyl) ether was made basic with 10% aqueous sodium hydroxide resulting in a clear solution followed by formation of a heavy precipitate. This suspension was treated under stirring with 0.43 g. (0.011 mole) of sodium borohydride in small portions, and after stirring at 20° for 1.5 hours, the reaction mixture was maintained at 20° for an additional 15 hours. After acidification with 2 N-hydrochloric acid, the resulting solution was made basic with dilute sodium hydroxide and the formed precipitate of product filtered to give 6.8 g., which, on recrystallization (ethanol) afforded 5.3 g. (65%), M.P. 136–138°.

*Analysis.*—Calcd. for $C_{19}H_{22}BrClN_2O$: N, 6.8. Found: N, 6.9.

On solution in methanol and addition of a methanol solution containing one equivalent of hydrogen chloride, and removal of the methanol, the hydrochloride is obtained.

*Example 5.—1-(p-chlorophenacyl-4-(p-chlorobenzyl) homopiperazine hydrobromide*

A mixture of 7.2 g. (0.031 mole) of p-chlorophenacyl bromide in 50 ml. of isopropyl alcohol was maintained under reflux while treated with 7.0 g. (0.031 mole) of $N^1$-(p-chlorobenzyl)homopiperazine over 20 minutes. On cooling and adding water, the product crystallized and was recrystallized (acetonitrile) to give 2.6 g. (19%), M.P. 176–178°.

*Analysis.*—Calcd. for $C_{20}H_{23}BrCl_2N_2O$: C, 52,51; H, 5.1; N, 6.1. Found: C, 52.2; H, 5.0; N, 5.8.

*Example 6.—2-[4-(p-chlorobenzyl)homopiperazinyl]-1-(p-chlorophenyl)ethanol*

A mixture of 1.5 g. (0.0033 mole) of product of Example 5 in 15 ml. of ethanol was made basic with aqueous sodium hydroxide, and treated with 0.2 g. of sodium borohydride added portion-wise. After standing 20 hours, the reaction mixture was acidified and then made basic, whereupon the product crystallized. On recrystallization there was obtained 0.6 g. (ethanol-water), M.P. 78–79°.

*Analysis.*—Calcd. for $C_{20}H_{24}Cl_2N_2O$: C, 63.3; H, 6.4; N, 7.4. Found: C, 63.9; H, 6.3; N, 7.0.

*Example 7.—N-p-bromophenacyl-N-p-chlorobenzyl homopiperazine hydrobromide*

Following the procedure of Example 5, and substituting p-bromophenacyl bromide, the subject compound was obtained in 15% yield, M.P. 180–182° (acetonitrile).

*Analysis.*—Calcd. for $C_{20}H_{23}Br_2ClN_2O$: C, 47.8; H, 4.6; N, 5.6. Found: C, 47.9; H, 4.8; N, 5.4.

The compound was reduced to the corresponding ethanol, 2 - [4 - (p - chlorobenzyl)homopiperazinyl] - 1 - (p-bromophenyl)ethanol, following the procedure of Example 6.

*Example 8.—2-[4-(2,4-dichlorobenzyl)piperazinyl]-1-phenylethanol*

A mixture of 61.5 g. (0.25 mole) of $N^1$-(2,4-dichlorobenzyl)piperazine and 30.0 g. (0.25 mole) of styrene oxide in 300 ml. of ethanol was heated under reflux over 2.5 hours. When colo, the precipitated product, 58 g. was separated and recrystallized (ethanol) to give 52.5 g., M.P. 145–147°.

*Analysis.*—Calcd. for $C_{19}H_{22}Cl_2N_2O$: C, 62.5; H, 6.1; N, 7.7. Found: C, 62.0; H, 5.9; N, 8.0.

*Example 9.—2-[4-(3,4-dichlorobenzyl)piperazinyl]-1-phenylethanol*

A solution of 4.9 g. (0.02 mole) of $N^1$-(3,4-dichlorobenzyl)piperazine and 2.4 g. (0.02 mole) of a styrene oxide in 50 mls. of ethanol was heated under reflux for 13 hours. When cool, the formed product was recrystallized (ethanol) and gave 3.9 g. (54%), M.P. 134–135°.

*Example 10.—2-[4-(p-chlorobenzyl)piperazinyl]-1-(p-chlorophenyl)ethanol*

Sodium borohydride (0.39 g., 0.01 mole) was added portion-wise to a suspension of 6.5 g. (0.018 mole) of 1-(p-chlorophenacyl)-4-(p-chlorobenzyl)piperazine in 75 mls. of ethanol which had been made basic with 40% aqueous sodium hydroxide. After 48 hours at 20°, the reaction mixture was acidified and then made basic with dilute sodium hydroxide, whereupon the product precipitated. The product was separated, 6.0 g. (91%), and on recrystallization (acetonitrile) melted 126–127°.

*Analysis.*—Calcd. for $C_{19}H_{22}Cl_2N_2O$: C, 62.5; H, 6.1; N, 7.7; Cl, 19.4. Found: C, 62.1; H, 6.0; N, 7.6; Cl, 19.1.

*Example 11.—2-[4-(2,4-dichlorobenzyl)piperazinyl]-1-phenylethyl chloride hydrochloride*

2-[4-2,4-dichlorobenzyl)piperazinyl] - 1 - phenylethanol (30.2 g., 0.083 mole) was added in small portions to 100 mls. of thionyl chloride with stirring while cooling in ice bath. The mixture was then refluxed for 4 hours with continued stirring, cooled, and equal volume of dry ether added and the solid filtered off and washed with ether to give the product.

In a similar manner the ethanol of Example 6 is converted to the chloride hydrochloride.

*Example 12.—2-[4-(3,4-dichlorobenzyl)piperazinyl]-1-phenylethyl chloride hydrochloride*

Thionyl chloride (100 mls.) was cooled in an ice bath and stirred while 31.0 g. of 2-[4-(3,4-dichlorobenzyl) piperazinyl]-1-phenylethanol was added in small portions. After then refluxing for 4 hours with continued stirring, the mixture was cooled, an equal volume of dry ether added and the solid filtered and washed with ether to give the product.

In a similar fashion 2-[4-(p-chlorobenzyl)piperazinyl]-1-(p-chlorophenyl)ethyl chloride hydrochloride and 2-[4-(p-chlorobenzyl)piperazinyl] - 1 - (p-bromophenyl) ethyl chloride hydrochloride were prepared.

Substituting thionyl bromide for the thionyl chloride in synthesis as described above, converts the ethanol to the corresponding ethyl bromide hydrobromide.

In addition to the specific working examples described above, and employing similar synthetic procedures, a variety of other active bronchodilators have been processed and are described and characterized in Table II below.

TABLE II

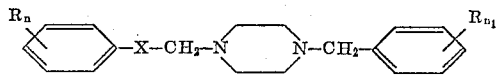

| $R_n$ | X | $R_{n_1}$ | Salt | M.p., °C.[a] |
|---|---|---|---|---|
| 4-Cl | —CO— | 3,4-diCl | HBr | 228–229 |
| 4-Br | —CO— | 3,4-diCl | HBr | 236–237 |
| 4-Cl | —CHOH— | 2,4-diCl | | 133–134 |
| 4-Cl | —CHOH— | 3,4-diCl | | 126 |
| 4-Br | —CHOH— | 3,4-diCl | | 140 |
| 3,4-diCl | —CO— | 3,4-diCl | | [a1] 190–192 |
| 4-Br | —CO— | 4-Br | HBr | [a2] 230–231 |
| 3,4-diCl | —CHOH— | 3,4-diCl | | 125 |
| H | —CO— | 2,4-diCl | HCl | 193–194 |
| 3,4-diCl | —CHOH— | 2,4-diCl | | 116 |
| 3,4-diCl | —CHOH— | 4-Cl | | 148–150 |
| 4-Cl | —CHOH— | 4-Br | | 135–136 |
| 4-Br | —CHOH— | 4-Br | | 142–143 |
| 3,4-diCl | —CO— | 2,4-diCl | HBr | 218–219 |
| 4-Cl | —CO— | 4-Br | HBr | 226–229 |

[a] The compounds were recrystallized from ethanol unless otherwise indicated.
[a1] isopropyl alcohol.
[a2] methanol.

Other compounds include 1-(p-fluorophenacyl)-4-(2,4-dichlorobenzyl) piperazine, 1 - (p-chlorophenacyl)-4-(p-iodobenzyl)piperazine, 1-(p-chlorophenacyl) - 4 - [β-(p-chlorophenyl)ethyl]-piperazine, 2 - ([4-β-(2,4-dichlorophenyl)ethyl]homopiperazinyl) - 1 - (p - chlorophenyl) ethanol.

The compounds of this invention are preferably administered orally in the form of tablets and capsules containing 2–100 mg. of active ingredient combined with fillers, extenders and lubricants and the like, prepared in the conventional manner or formulated in sustained release forms, as well as other orally utilizable formulations including elixirs, suspensions and other similar pharmaceutical dosage forms. For parenteral administration, the compounds desirably as their monohydrochloric acid salts, may be incorporated in solution, in a non-toxic vehicle and sterilized, preferably by filtration. Preservatives may be added for injectable multiple dose vials. In addition, the compounds can be formulated as an inhalation aerosol or provided in a form for dispensing by atomizers, nebulizers, and similar devices. The compounds may also be formulated to include more than one active ingredient herein disclosed, or to contain other active drugs when desired.

To establish the effectiveness of the compounds of this invention, the following tests were employed.

Guinea pigs of either sex are selected on the basis of sensitivity (demonstrated by collapse) to exposure to aqueous 0.2% histamine aerosol under standard conditions for 3–5 minutes. Sensitive animals are allowed to recover for 2–4 hours. At the end of the recovery period, test compound is administered, either orally or subcutaneously, and 90 minutes later the pigs are re-exposed to the aerosol. Those pigs not collapsing in 5 minutes are considered protected. Six pigs are studied per dose level and the dosage level plotted against the percent of pigs protected, and the effective dose providing 50% protection ($ED_{50}$ histamine) is established.

Typical of the pharmacological observations are the results noted with the following compounds:

1-(p-chlorophenacyl) - 4 - (p-chlorobenzyl)piperazine (Compound A);

1-(p-bromophenacyl) - 4 - (p-chlorobenzyl)piperazine (Compound B);

2 - [4-(p-chlorobenzyl)piperazinyl]-1-(p-bromophenyl) ethanol (Compound C);

2-[4-(p-chlorobenzyl)piperazinyl]-1-(p-bromophenyl)- (Compound D).

Compound A, which was not toxic to mice at 1000 mg./kg. in the bronchodilator test described above, had an $ED_{50}$ of 5.1 mg./kg. subcutaneous, and an $ED_{50}$ histamine of 2.7 mg./kg. when given orally.

This compound was inactive when assessed orally for its effect on Evipal sleeping time at 10–45 mg./kg., as a muscle relaxant at 10–40 mg./kg., as an analgesic at 10–100 mg./kg. and as an anticonvulsant at 10–20 mg./kg. On application to the guinea pig eye at 20 mg./ml. it was without anesthetic effect.

Upon injection to the anesthetized dog, at 5 mg./kg. intravenously, it showed no sustained or definitive effect on blood pressure, heart rate, or respiration, on adrenaline or acetylcholine.

Compound B, which was not toxic to mice at 1000 mg./kg. when assessed for bronchodilator activity had an $ED_{50}$ histamine (subcutaneous) of 20.0 mg./kg. whereas the oral $ED_{50}$ in this test was 3.3 mg./kg. It was without effect when administered orally in the following test systems in the dosage ranges indicated: Evipal sleeping time (10–20 mg./kg.), anticonvulsant (10–20 mg./kg.), motor activity (10–20 mg./kg.), cholesterol levels (60 mg./kg.). It was inactive as an anesthetic when evaluated at 20 mg./ml. on the guinea pig eye.

Injected (intravenous) in the anesthetized dog at 5 mg./kg. it showed essentially no effect on blood pressure, heart rate or respiration, histamine, adrenaline or acetylcholine.

Compound C, which was non-toxic to mice at 1000 mg./kg., in the bronchodilator test had an $ED_{50}$ (subcutaneous) of 9.2 mg./kg. whereas on oral administration the $ED_{50}$ was 3.0 mg./kg. It was without effect when evaluated orally in the following test systems: Evipal sleeping time (5–30 mg./kg.), muscle relaxant (10–20 mg./kg.), analgesic (10–20 mg./kg.), anticonvulsant (10–20 mg./kg.), motor activity (20 mg./kg.), cholesterol (60 mg./kg.). It was without effect as an anesthetic when evaluated in the guinea pig eye at 20 mg./ml.

Upon intravenous injection at 5 mg./kg. to the anesthetized dog it was without significant effect on blood pressure, heart rate, adrenaline, or acetylcholine.

Compound D which was not toxic to mice at 1000 mg./kg. in the bronchodilator test showed $ED_{50}$ histamine of 2.9 mg./kg. and 2.0 mg./kg. when evaluated subcutaneously or orally respectively.

The compound was inactive when evaluated orally in the following test systems: Evipal sleeping time (10–60 mg./kg.), anticonvulsant (10–20 mg./kg.), muscle relaxant (10–40 mg./kg.), analgesic (10–20 mg./kg.), motor activity (10–20 mg./kg.).

On intravenous injection at 5 mg./kg. in the anesthetized dog it was without substantial or significant effect on blood pressure, histamine, adrenaline or acetylcholine.

These detailed data reflect the remarkable bronchodilator activity of typical compounds of this invention. In addition, this activity is demonstrable at very low dosages when administered orally. The essential freedom from side reactions has been characterized by and employing dosage levels considerably higher than that needed for good bronchodilator action, and no significant effects on the central nervous system response, or the cardiovascular system are indicated.

Further, toxicity studies have demonstrated that the compounds are relatively non-toxic.

It is to be understood that it is intended to cover all changes and modifications of the examples herein chosen for the purpose of illustration which do not constitute departures from the spirit and scope of the invention.

We claim:

1. A compound of the formula

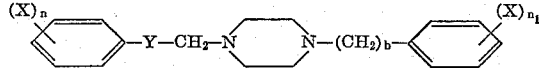

wherein X is halogen, $n$ and $n_1$ are each integers from zero to four, the sum of $n$ and $n_1$ being at least two, $b$ is an integer from 1 to 2, and Y is selected from the group consisting of $$-\underset{\underset{O}{\|}}{C}-$$

—CHOH—, —CHCl—, —C=NNH$_2$—, and
—C=NOH—

2. The compound

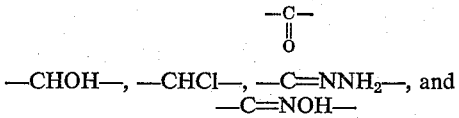

3. The compound

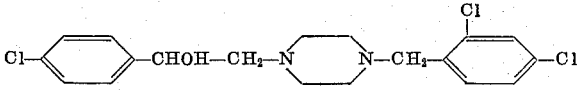

4. The compound

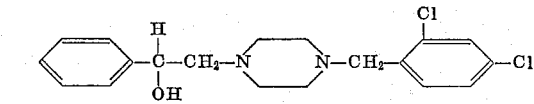

5. The compound

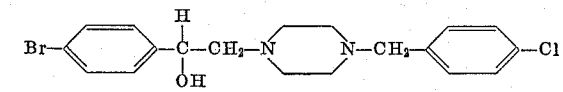

6. The compound

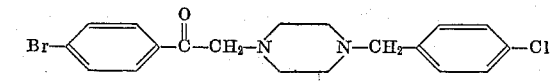

7. The compound

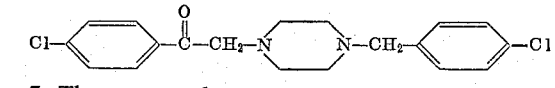

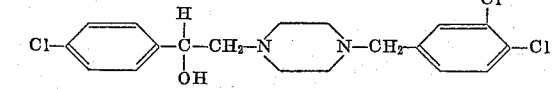

8. The compound

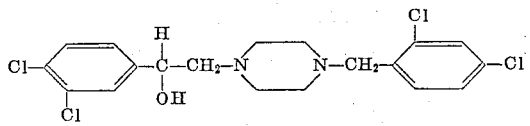

9. The compound

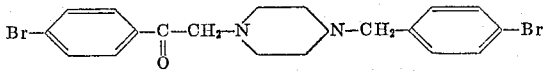

10. The compound

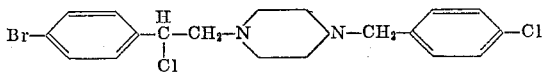

References Cited by the Examiner

UNITED STATES PATENTS

| | | | |
|---|---|---|---|
| 2,647,121 | 7/53 | Jacoby | 260—268 |
| 2,834,782 | 5/58 | Schlesinger et al. | 260—268 |
| 2,927,924 | 3/60 | Mills | 260—268 |
| 2,939,816 | 6/60 | Trexler | 167—55 |
| 2,979,508 | 4/61 | Janssen | 260—268 |
| 2,980,683 | 4/61 | Zaugg et al. | 260—268 |
| 2,990,327 | 6/61 | Halpern | 167—55 |
| 2,997,472 | 8/61 | Janssen | 260—268 |
| 2,997,474 | 8/61 | Janssen | 260—268 |
| 3,007,928 | 11/61 | Parcell | 260—268 |

FOREIGN PATENTS

| | | |
|---|---|---|
| 205,503 | 10/59 | Austria. |
| 346,221 | 6/60 | Switzerland. |

OTHER REFERENCES

Lutz et al.: Journal Organic Chemistry, vol. 12, pp. 771–775 (1947).

IRVING MARCUS, *Primary Examiner.*

NICHOLAS S. RIZZO, *Examiner.*